US012807061B2

(12) United States Patent
Martin

(10) Patent No.: US 12,807,061 B2

(45) Date of Patent: Nov. 24, 2026

(54) RATCHETING CARGO STRAP APPARATUS WITH DYNAMIC TENSION

(71) Applicant: Grant Martin, Doral, FL (US)

(72) Inventor: Grant Martin, Doral, FL (US)

(*) Notice: Subject to any disclaimer, the term of this patent is extended or adjusted under 35 U.S.C. 154(b) by 58 days.

(21) Appl. No.: 18/648,997

(22) Filed: Apr. 29, 2024

(65) Prior Publication Data

US 2025/0332981 A1 Oct. 30, 2025

(51) Int. Cl.
*B60P 7/08* (2006.01)

(52) U.S. Cl.
CPC .................................... *B60P 7/083* (2013.01)

(58) Field of Classification Search
CPC ....... B60P 7/0861; B60P 7/0823; B60P 7/083; B60P 7/0869; B60P 3/07; B60P 7/0853; B60P 7/0846; B60P 7/0838; Y10T 24/2175; Y10T 24/316; Y10T 29/49826
See application file for complete search history.

(56) References Cited

U.S. PATENT DOCUMENTS

| | | | | |
|---|---|---|---|---|
| 707,388 A * | 8/1902 | Chaffin | F16F 1/128 | 267/71 |
| 4,694,541 A * | 9/1987 | Skyba | F16G 11/12 | 24/301 |
| 5,402,557 A * | 4/1995 | Dalen | B60P 7/0823 | 24/301 |
| 7,231,693 B2 * | 6/2007 | Wilcox | B60P 7/0861 | 24/68 CD |
| 7,530,334 B1 * | 5/2009 | Napolitano | A01K 27/005 | 119/769 |
| 8,099,836 B2 * | 1/2012 | Breeden | B60P 7/083 | 24/68 CD |
| D686,894 S * | 7/2013 | Breeden | B60P 7/083 | D8/44 |
| 9,376,050 B1 * | 6/2016 | Gill | B60P 7/0823 | |
| 9,862,300 B1 * | 1/2018 | Anderson | B60P 7/0846 | |
| 10,065,554 B1 * | 9/2018 | Xia | B60P 7/083 | |
| 10,086,745 B2 * | 10/2018 | Gill | B60P 7/0861 | |
| 11,794,628 B1 * | 10/2023 | Martin | B60P 7/0838 | |
| 2013/0192539 A1 * | 8/2013 | Woodruff | A01K 27/005 | 119/798 |
| 2016/0159268 A1 * | 6/2016 | Davies | B60P 7/0861 | 24/301 |
| 2023/0349200 A1 * | 11/2023 | Rivera | A61F 5/3769 | |

* cited by examiner

*Primary Examiner* — Jason W San
*Assistant Examiner* — Louis A Mercado

(57) ABSTRACT

A ratcheting strap apparatus is provided which effectuates dynamic tension when securing a load to allow for shifting, sinking, or certain movements of the items being secured to prevent damage of such items. The ratcheting cargo strap may include a strap, a ratchet assembly, a spring, a compression component, and a hook wherein the strap may be configured as a single continuous strap without interconnecting links and wherein the strap may be attached to the ratchet assembly on one end and includes free slack on the opposite end of the strap. The strap may be configured to extend through the spring as well as through a loop of the hook on one end of the spring and around a compression component on the opposite end of the spring.

12 Claims, 5 Drawing Sheets

RATCHETING CARGO STRAP APPARATUS WITH DYNAMIC TENSION

GOVERNMENT CONTRACT

Not applicable.

CROSS REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to cargo straps, and more particularly to ratcheting cargo straps.

BACKGROUND

Existing cargo straps, commonly used to secure cargo for transport, often encounter certain challenges that limit their effectiveness. One of the primary issues with traditional cargo straps is their excessive rigidity when securing cargo, which may result in damage to the cargo due to the inability of the strap to absorb vibrations or shifts during transport. Furthermore, this rigidity prevents the straps from adjusting to minor changes in a load's dimensions caused by movement or settling, which leads to the strap becoming loose or unsecured.

Bungee-type cargo straps are commonly proposed for securing loads, however, they unfortunately fail to adequately solve these problems as their tension cannot be controlled, and they further lack safe means for releasing tension. Similar weaknesses plague other proposals that rely on natural and/or synthetic rubber to provide tension.

For the foregoing reasons, a solution is needed that solves the issue of straps being too rigid to prevent damage to cargo and other items being transferred due to their inability to absorb shifts and movement types.

SUMMARY

The present disclosure is directed to an apparatus that accommodates shifting cargo loads in order to prevent damage of such loads during transportation and shipment.

In one embodiment, the ratcheting cargo strap apparatus may include a strap, a ratchet assembly, a spring, a compression component, and a hook wherein the strap may be configured as a single continuous strap without interconnecting links, and wherein the strap may be attached to the ratchet assembly on one end and includes free slack on the opposite end of the strap. The hook may comprise a claw hook and a loop, and the strap may be configured to extend through the spring a plurality of times as well as through the loop of the hook on one end of the spring and around the compression component on the opposite end of the spring in a manner that holds the spring in a position abutting the hook. It is contemplated that such configuration enables the apparatus to accommodate shifting, sinking, depression and other movements of items secured by the apparatus without losing the tension necessary to secure such items.

DETAILED DESCRIPTION

The detailed description set forth below in connection with the appended drawings is intended as a description of certain embodiments of a ratcheting cargo strap apparatus and is not intended to represent the only forms in which such apparatus may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
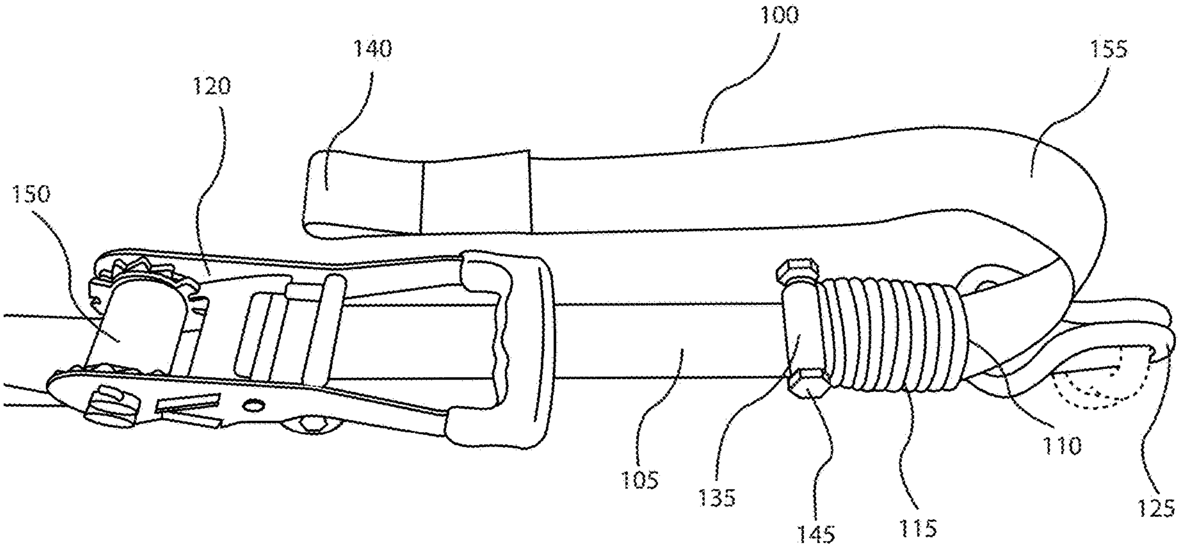
FIG. 1 shows one embodiment of an upper perspective view of the invention in a load state with slack.

Referring to FIG. 1, In accordance with one embodiment, the ratcheting cargo strap may be configured with a spring component (alternatively referred to herein as, simply, the "spring") for maintaining tension desired for securing cargo during transport without being too ridged. The inclusion of a spring component within the ratchet assembly 120 provides dynamic tension, which allows the strap to adjust dynamically to the cargo's movement. The compression that it provides may be crucial in situations where the cargo undergoes vibrations, shifts, or settling, which are common in transit environments. The spring's ability to extend and retract minimizes the risk of the strap becoming either too tight, potentially damaging the cargo, or too loose, risking the cargo's stability.

Moreover, the provision of such dynamic tension is essential for the absorption of energy that results from road vibrations, jolts, or changes in velocity. The spring's inherent quality to compress and expand allows the ratcheting cargo strap to act as a shock absorber, mitigating the forces that typically cause wear and tear or deformation of the secured items. This is particularly beneficial for fragile or sensitive cargo that could otherwise be compromised by the rigors of constant movement. By adapting to the contours and movements of the cargo load without losing tension, the cargo strap ensures that the items remain secured, while also allowing a cushioned movement that prevents damage. This dual functionality is a testament to the careful engineering designed to preserve cargo integrity and provide peace of mind during the transportation process.

In some embodiments, a ratcheting strap apparatus may include a strap 100, a ratchet assembly 120, a spring 115, and a hook 125 wherein the strap 100 may be configured with a plurality of sections. Further, in certain embodiments, there may be a second or counter strap 150 that may be connected to an opposite end of a ratchet assembly 120 that may, for example, also have a secondary or counter hook (not pictured) attached to an end opposite to the end that may be connected to the ratchet assembly 120. One of ordinary skill in the art will be familiar with the general configuration of ratchet assemblies. In particular, and for the sake of providing one non-limiting example of a ratchet assembly using two straps, a first and second "pawl" 152*a*, 152*b*, seen most clearly in FIG. 4, may be hingedly disposed on either side of a toothed "windlass" 154. A handle 156 extends from one pawl, while a bolt (such as bolt 158 in FIG. 5) or other structure sufficient to provide anchor to a strap, such as strap 100, is disposed adjacent to the second pawl. Still, in some embodiments, there may be a single strap 100 that may run through the ratchet assembly 120 that may be connected to hooks or other attachment mechanisms on both ends to attach to external mounting mechanisms such as those found in truck beds, on boats and docks, within storage facilities, among other scenarios where items need mounting.

The strap 100 may be any type of securing mechanisms such as, for example, tie-down straps, ropes, chains, and cables. Such straps, such as tie-down straps may be made of materials such as polyester, a popular choice for cargo straps due to its high strength and durability, nylon, which can be beneficial for absorbing shocks during transport, polypropylene, composite materials, blended fibers—like Kevlar—with traditional fabrics, which may provide enhanced strength-to-weight ratios while providing additional resistance to cutting and abrasion. Such material may be formed as webbing and may be up to about 1 inches, 2 inches, 3 inches, 4 inches, 5 inches or more wide according to the needs and preferences of the user.

Figure 2:
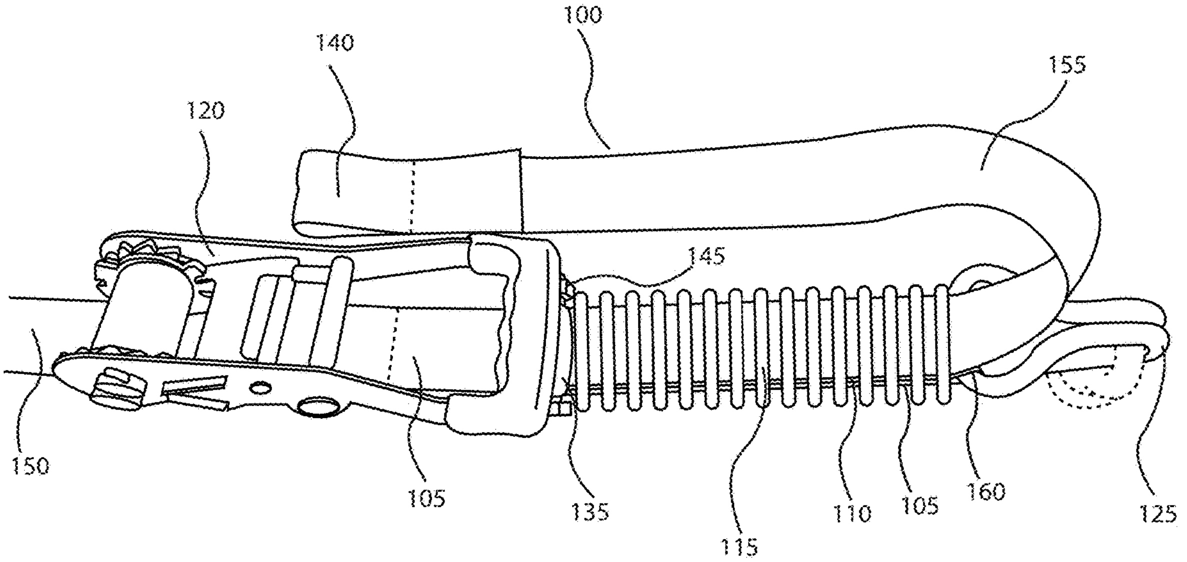
FIG. 2 shows one embodiment of an upper perspective view of the invention in a rest state with slack.

In certain embodiments, the plurality of sections of the strap 100 may comprise a tension section 105, a spring section 110, and a slack section 155. In some embodiments, such sections may be overlapping as the invention ebbs and flows between certain states such as, for example, when the ratcheting cargo strap is in a rest state as shown in FIG. 2, in a load or stress state shown in FIGS. 1 and 3, when it is being incrementally tightened, or when it is under pressure of certain types of movement due to, for example, cargo movements and shifting. Further, such sections may be defined in many embodiments by a particular section's proximity to certain elements in the ratcheting cargo strap's configuration. For example, although the strap 100 may technically be, in some embodiments, a single continuous strap 100 (which may also be, for example, a chord, cable, chain, or rope), the tension section 105 may be defined by its proximity to the ratcheting assembly and extending initially through the spring 115 and then looping around a loop or ring of a hook 125, wherein, in many embodiments, the looping of the strap 100 through such a loop or ring of a hook 125 may represent a transition from the tension section 105 to the spring section 110.

Furthermore, the transition between certain sections of the strap 100 may be fluid. because when a strap is tightened, loosened, or flexing with dynamic tension, the strap 100 may, in many embodiments, may slide or move around. For example, around the loop or ring of hook 125, this provides more strap length on one side or the other of such a ring or loop. As shown in FIG. 1., when the strap 100 is under load pressure, the spring 115 becomes compressed, which causes the tension section 105, for example, to become longer and the spring section 110 to become shorter. Conversely, where the tension of the strap 100 is reduced, the spring 115 decompresses such that the spring section 110 may become longer, and the tension section 105 may become shorter. In certain embodiments, this transition or adjustable portion between such sections, as shown in FIG. 2, may further be referred to herein as a hook section 160 to represents certain adjacent portions of the tension section 105 and the spring section 110 that adjust during tightening, loosening, and under the stress of various types of movement wherein the spring 115 compresses and decompresses.

Similarly, in some embodiments, the transitionary portion between the spring section 110 and those certain embodiments featuring a slack section 155, there may be similar types of adjustments in such a strap 100 in relation or proximity to components making up the ratcheting cargo strap. In certain embodiments, when the ratcheting cargo strap is wrapped around, for example, cargo in a truck bed and is tightened, the spring section 110 may become shorter, and the slack section 155 may become longer as the spring 115 becomes compressed, and vice versa when the spring becomes decompressed.

Figure 5:
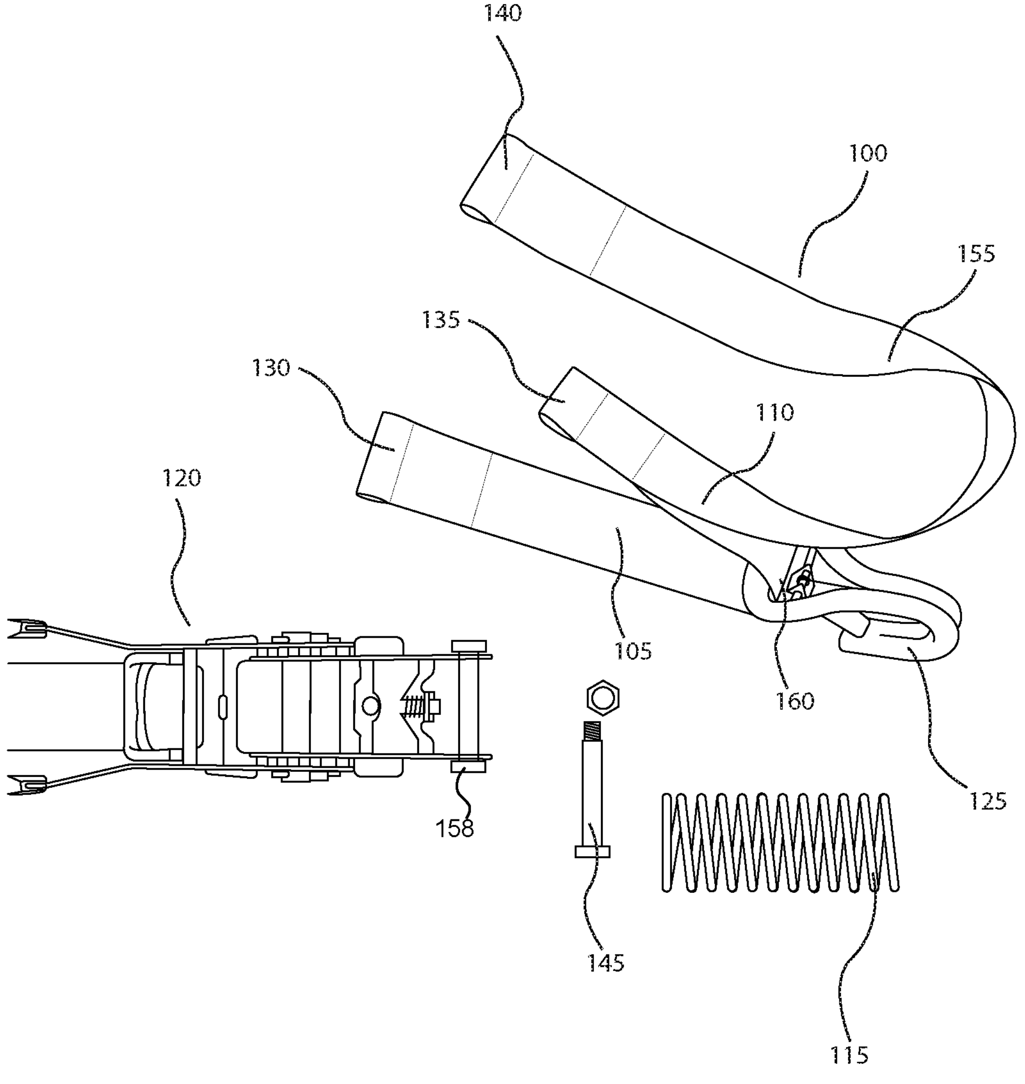
FIG. 5 shows one embodiment of the invention in a disassembled state.

With reference in particular to FIG. 5, in some embodiments, each of the plurality of sections may correspond to one of a plurality of loops. In many embodiments, the plurality of loops may comprise a tension loop 130, a spring loop 135, and a slack loop 140. In certain embodiments, such loops may be configured to be integral with the strap 100 and made up, for example, from a fold in a portion of the strap 100 wherein the strap 100 may be sewn back onto itself to form a loop with enough strength to hold heavy objects in place without coming undone from itself under the pressure of significant weight or movement in, for example, cargo that is being secured by the ratcheting cargo strap. In some embodiments, the strap 100 may be sewn back on to itself with stitch patterns known to those of ordinary skill in the art to be particularly strong. For instance, a box stitch may be used to secure the strap 100 upon itself.

In some embodiments, however, the loops corresponding to the sections of the ratcheting cargo strap may be made of an alternative material wherein such loops may be separately attached to its respective position on a portion of the strap 100. These may be secured to the strap 100 in any manner sufficient to ensure that alternative materials remain attached in their positions along the length of the strap 100. Of course, one of ordinary skill in the art will recognize that it is possible that the loops corresponding to the sections of the ratcheting cargo strap may comprise any combination of folded self-portions and/or alternative materials without departing from or limiting the invention.

Tension Section 105

Returning to FIGS. 1 and 2, in some embodiments, the tension section 105 may form a portion of the strap 100 that is adjacent to a ratchet assembly 120 on a first side and the spring section 110 on an opposing side. In some embodiments, the tension section 105 may be configured to provide a secure connection between the ratchet assembly 120 on one end and a hook 125 on another end. In some embodiments, the tension section 105 may be configured with a tension loop 130, shown more clearly in the exploded view of FIG. 5, on a portion of the tension section 105 that is near or adjacent to the ratchet assembly 120. In certain embodiments, a tension loop 130 of the tension section 105 may be wrapped around a tension ratchet bolt, which may be integral with the ratchet assembly 120 or detachable interconnected with the ratchet assembly 120.

Further, the tension section 105 may be loosely wrapped around a loop or ring of a hook 125 to provide the ability to slide or adjust upon, for example, tightening, loosening, or flexing of the strap 100. In some embodiments, the tension section 105 may also be directly connected to a loop or ring of a hook 125 on an opposing end of the tension section 105 to the connection with a ratchet assembly 120.

Spring Section 110

In some embodiments, the spring section 110 may form a middle portion of the strap 100, positioned between the tension section 105 and a slack section 155. More particularly, in certain embodiments, the spring section 110 may comprise a middle portion of the strap 100, wherein one end of such spring section 110 may be defined by a portion configured to be wrapped around or otherwise connected to a loop or ring defined by hook 125. The spring section 110 may further extend through spring 115 on an end of the spring 115 opposite from the hook 125, the spring section 110 may wrap around a compression component 145, such as, for example, a bolt, that is configured to keep the spring section 110 of the strap 100 extended entirely through the length of the spring 115 at all times. Further, in some embodiments, the spring section 110 may be folded upon itself and extended back through the spring 115 until it transitions to a portion of the strap 100 extending beyond the end of the spring 115 proximate to the hook 125.

In some embodiments, the spring section 110 may define one layer of a strap 100 that extends from the hook 125, through the spring 115, to be attached or wrapped around to a compression component 145 of a greater width or diameter than the spring 115, such as, for example a bolt or other object with enough rigidity to sustain heavy strain without breaking under load. In certain embodiments, such a spring section 110 may not extend back through the spring 115 as other embodiments may be configured. In certain embodiments where the strap 100 does not extend back on itself through the spring 115, the compression of the spring may be initiated through tension from ratchet assembly 120 tightening the tension section 105 by ratcheting from the opposite direction, rather than pulling slack section 155 in an opposite direction to tighten the ratcheting cargo strap.

In some embodiments, the spring section 110 may secure itself with the compression component 145 by sewing two portions of the spring section 110 together, so it stays tight around such a compression component 145 to avoid a risk of the compression component 145 of coming loose. Further, in certain embodiments, the compression component 145 may have edges that are of a wider width or diameter as the spring loop 135 of the spring section 110, so it remains in place without the ability to slide laterally out of the spring loop 135 of the spring section 110.

Slack Section 155

Figure 3:
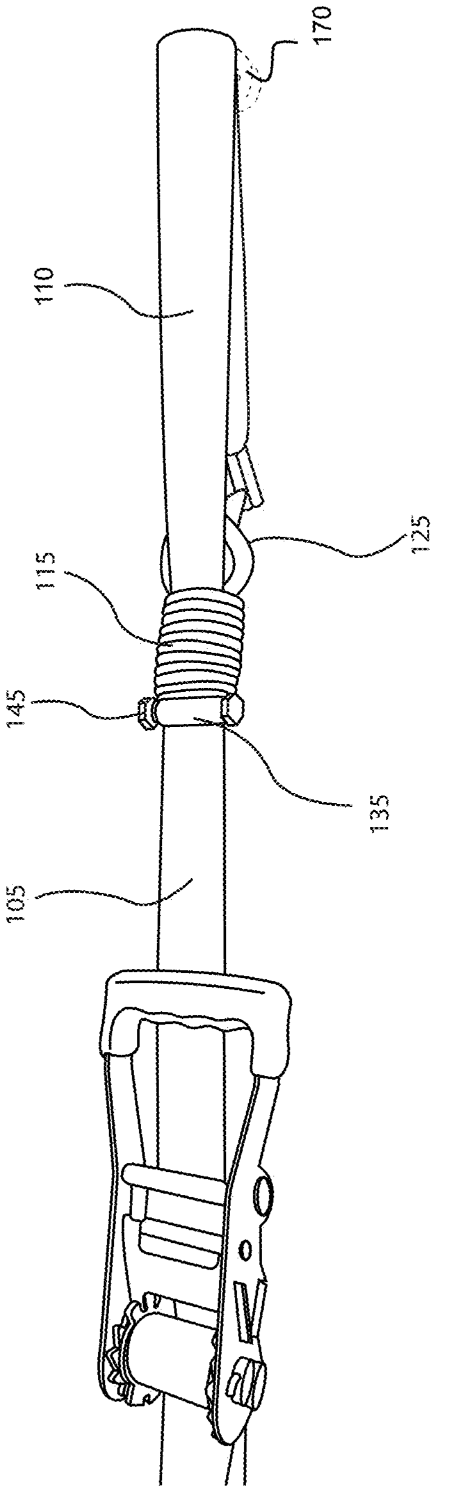
FIG. 3 shows one embodiment of an upper perspective view of the invention in a load state with slack hooked to the hook.
Figure 4:
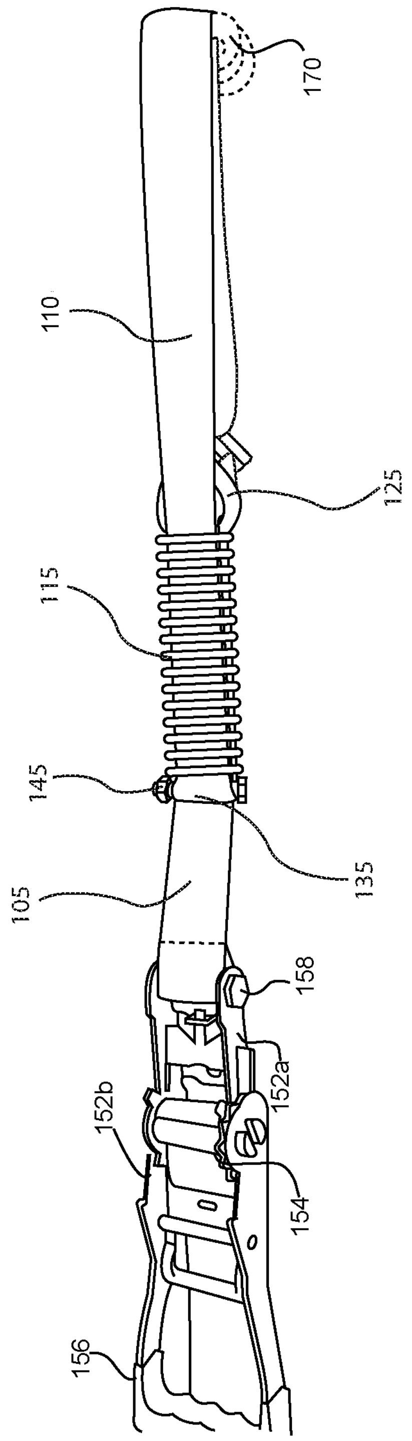
FIG. 4 shows one embodiment of an upper perspective view of the invention in a rest state with slack hooked to the hook.

In certain embodiments, slack section 155 may define a distal portion of the strap 100 adjacent to the spring section 110. The slack section 155 may be configured to provide slack in the strap 100 and may be used as leverage to pull the strap 100 for tightening purposes. Further, in some embodiments, the slack section 155 may be configured with one or more loops that may be integral with a portion of the tension section 105 beyond the end of the spring 115. In certain embodiments a loop may be configured to on a portion of the slack section 155 that is formed at or near the distal end of the slack section 155 opposite to the portion of such a slack section 155 that is adjacent to the spring section 110. In some embodiments, a loop of the slack section 155 (also referred to herein as a slack loop 140) may be configured in a manner that enables the loop to be hooked around, as shown in FIGS. 3 and 4 for example, an external hooking or mounting component 170, or for example, the slack section 155 may be looped through or around an external mounting component 170 wherein a slack loop 140 may be hooked around the ratcheting cargo strap's hook 125 to provide further tension and security of the load being secured by the ratcheting cargo strap. As one non limiting example, when transporting cargo, the slack loop 140 of the slack section 155 may loop through a mount or hook within an edge of a truck bed for securing the ratcheting cargo strap over or around such cargo.

Spring 115

In some embodiments, the ratcheting cargo strap may be configured with a spring 115 may define an inside wide enough to accept one or more of a plurality of the strap sections (such as the tension section 105 and multiple instances of the spring section 110) through. In many embodiments, a spring 115 may be configured to provide compression and decompression when the ratcheting cargo strap is tightened and loosened, which, when under load, provides dynamic tension to safely accommodate some shifting and movement of items being secured by the ratcheting cargo strap without causing damage.

The dynamic tension resulting from the use of a spring 115 is advantageous in many ways, including the ability to provide such dynamic tension without having to include weaker flexible materials in the design that may provide give for movement and shifting loads, but may not be ideal when, for example, a load or items being secured may be of a significant weight or when transported items may undergo forceful movements that could increase the chances that a securing mechanism will break. In some embodiments of the ratcheting cargo strap, the spring 115 may overcome issues relating to durability because it may use spring compression which, when compressed retains the underlying strength of the strap 100 being used without relying on weaker materials between strap 100 components. For example, in embodiments where the tension section 105 is fed through the inside of the spring 115 and looped through loop or ring component of hook 125 and the spring section 110 is looped through the spring 115, there would be no break in the continuous length of strap 100. This preserves the original strength of the strap 100 while providing the dynamic tension necessary to allow for movement of any heavy cargo loads and secured objects.

In many embodiments, the spring 115 may be configured so that one end of the spring 115 is near or abutting the hook 125 while the ratcheting cargo strap is tightened or under load. In certain embodiments, the configuration of the spring 115, tension section 105, spring section 110, and compression component 145, may inherently cause the spring to abut the hook 125 because when opposite ends of the strap 100 are attached to external mounting objects, opposing forces act upon the ratcheting cargo strap so that the tension section 105 pulls an adjacent portion of the spring section 110 through the spring 115 toward the hook 125. Such tension naturally reduces the length of the spring section 110 and compresses the spring 115 as the ratcheting cargo strap is tightened due to the compression component 145 being attached to the spring section 110 on an opposite end of the hook 125.

Hook 125

In some embodiments, the ratcheting cargo strap hook 125 may be disposed proximate to the spring 115. In certain embodiments, the hook 125 may include a loop or ring component to accept certain sections of the strap 100. In many embodiments, the hook 125 may serve to hook or attach to external mounting mechanisms, such as, for example, those found in truck beds, but which may also include as non-limiting examples, slats, rails, bars, and other structures. Additionally, the hook 125 may, in some embodiments, be used to attach the slack section 155 back to the ratcheting cargo strap. For example and not limitation, the slack section 155 be looped through or around an external mounting component and back to the hook 125. One end of the slack section 155 may therefore be secured to the hook 125, stabilizing the cargo in place in circumstances where more length is needed in the strap 100 to accommodate certain loads.

The hook 125 may be claw hook or a carabiner, that may, for example form a loop or ring for accepting one or more of the plurality of sections of the strap 100 and/or external mounting mechanisms. In certain embodiments, the hook 125 may further be configured to include a safety catch to prevent hooked components from slipping off of the hook 125. Additionally, in some embodiments, the safety catch may be configured to be spring loaded.

Tension Optimization Order

In some embodiments, the strap 100 may further comprise a hook section 160 that may form an overlapping portion of the tension section 105 and the spring section 110. In certain embodiments, such a hook section 160, shown in FIGS. 2 and 5, may be configured to be fed through the loop or ring of the hook 125. In many embodiments, the tension section 105, hook section 160, and spring section 110 may further be configured in a tension optimization order wherein the tension section 105 may be fed through an inside of the spring, then the tension section 105 may transition into the hook section 160 to be fed through the hook 125 loop, then the hook section 160 may transition into the spring section 110 to be fed back through an inside of the spring, which may be in an opposite direction as the tension section 105, and then the spring loop 135 may wrap around compression component 145, and then the spring section 110 may be fed back through the inside of the spring in the same direction as the tension section 105.

In some embodiments, the tension optimization order may be configured to establish dynamic tension as the slack section 155 is pulled away from the spring section 110. In certain embodiments, the tension optimization order may be configured to establish such dynamic tension due to the tension section 105 being pulled away from the spring section 110. In many embodiments, tension provide in either direction from the tension section 105 side, the slack section 155 side, or both at the same time, may provide the requisite compression to the spring to provide dynamic tension.

In many embodiments, the configuration of the ratcheting cargo strap allows for shifting, sinking, or certain movements of the items being secured without losing the tension necessary to secure such items even in variable and unpredictable conditions.

These examples illustrate the broad utility of the apparatus for mounted information display beyond its conventional use on doors, demonstrating its potential as a versatile communication tool in a wide array of settings.

The invention claimed is:

1. A ratcheting strap apparatus comprising:

a ratchet assembly;

a strap securable to the ratchet assembly, the strap having a first end and a second end and defining a plurality of sections and a plurality of loops;

a spring having a first end and a second end and defining an inside configured to receive a plurality of layered portions of one or more of the sections of the strap therethrough;

a hook configured to receive the strap; and a compression component securable to an intermediary portion of the strap and configured to maintain the spring in a position proximate to the hook;

wherein the apparatus is operative to dynamically maintain tension to accommodate shifting, sinking, or certain movements of any items secured by the apparatus.

2. The apparatus of claim 1, wherein the strap is continuous.

3. The apparatus of claim 1, further comprises a secondary strap, wherein the ratchet assembly comprises a handle portion and an anchor portion hingedly connected about a windlass, wherein one end of the strap is securable to the anchor portion of the ratchet assembly, and wherein the secondary strap is securable to the ratchet assembly via the windlass.

4. The apparatus of claim 1, wherein the plurality of sections of the strap comprise at least a tension section, a slack section, and a hook section and the plurality of loops comprise at least a tension loop, a spring section, a spring loop and a slack loop.

5. The apparatus of claim 4, wherein the tension section and the spring section of the strap are configured to extend through the spring, the hook and the compression component are disposable along the strap on opposite ends of the spring, and the compression component is operative to secure the spring in a position abutting the hook.

6. The apparatus of claim 4, wherein the tension section, the hook section, and the spring section are configured in a tension optimization order wherein the tension section is configured to feed through the inside of the spring, the tension section transitions into the hook section, which is configured to feed through a hook loop, the hook section transitions into the spring section, which is configured to feed back through the inside of the spring, the spring loop is configured to securely receive the compression component, and the spring section is configured to feed back through the inside of the spring in a same direction as the tension section.

7. The apparatus of claim 1, wherein the compression component is integrated on one end of the spring as a hook.

8. The apparatus of claim 1, wherein the hook is selected from the group consisting of a j-hook, s-hook, carabiner, swivel hook, and snap hook.

9. A ratcheting strap apparatus for securing items with dynamic tension comprising:

a continuous strap having a plurality of sections comprising at least a tension section, a spring section, slack section, and a hook section, as well as a plurality of loops comprising at least a tension loop, a spring loop, and a slack loop;

a ratchet assembly comprising a ratchet bolt;

a spring defining an inside wide enough to accept one or more of the plurality of sections of the continuous strap; and a hook defining a hook loop configured to receive the strap;

wherein the tension section forms a portion of the strap adjacent to the ratchet assembly on a first side and the spring section on an opposing side, and the tension loop forms a portion of the tension section that is adjacent to the ratchet assembly is configured to wrap around the ratchet bolt, and the tension section is configured to be fed through the inside of the spring;

wherein the spring section forms a middle portion of the strap between the tension section and the slack section, the spring loop forms a middle portion of the spring section and is configured to wrap around a compression component wider than an outer diameter defined by the spring, and the spring section is configured to be fed through the inside of the spring parallel to the tension section one or more times;

wherein the slack section forms a distal portion of the strap adjacent to the spring section;

wherein a configuration of the apparatus dynamically accommodates shifting, sinking, and other movements of any items being secured by the apparatus.

10. The apparatus of claim 9, wherein the tension section, the hook section, and the spring section are further configured in a tension optimization order wherein the tension section is fed through the inside of the spring, then the tension section transitions into the hook section to be fed through the hook loop, then the hook section transitions into the spring section to be fed back through the inside of the spring in a counter direction to the tension section, and then the spring loop wraps around the compression component, and then the spring section is fed back through the inside of the spring in a same direction as the tension section.

11. The apparatus of claim 10, wherein the tension optimization order is configured to establish dynamic tension as the slack section is pulled away from the spring section.

12. The apparatus of claim 11, wherein the tension optimization order is configured to establish dynamic tension as the tension section is pulled by the ratchet assembly away from the spring section.

* * * * *